(12) United States Patent
Deniau et al.

(10) Patent No.: US 7,564,344 B2
(45) Date of Patent: Jul. 21, 2009

(54) TIRE PRESSURE MONITORING SYSTEM PLANT LEARNING

(75) Inventors: Jean-Christophe Deniau, Fenton, MI (US); Mark D. Wallace, White Lake, MI (US)

(73) Assignee: Continental Automotive Systems US, Inc., Auburn Hills ( * ) Notice: Subject to any disclaimer, the term of this patent is extended or adjusted under 35 U.S.C. 154(b) by 302 days.

(21) Appl. No.: 11/543,617

(22) Filed: Oct. 5, 2006

(65) Prior Publication Data

US 2007/0090928 A1    Apr. 26, 2007

Related U.S. Application Data

(60) Provisional application No. 60/729,025, filed on Oct. 21, 2005, provisional application No. 60/738,362, filed on Nov. 18, 2005.

(51) Int. Cl.
*B60C 23/04* (2006.01)

(52) U.S. Cl. .................. 340/447; 340/426.33; 340/5.1; 340/5.22; 701/115

(58) Field of Classification Search ......... 340/447–449, 340/5.1, 426.33, 5.22, 539.1, 539.19; 73/146.2; 701/29, 32, 33, 36, 115, 28
See application file for complete search history.

(56) References Cited

U.S. PATENT DOCUMENTS

| | | | | |
|---|---|---|---|---|
| 6,215,389 | B1 * | 4/2001 | Schmidt | 340/5.1 |
| 6,788,193 | B2 * | 9/2004 | King et al. | 340/447 |
| 6,965,305 | B2 * | 11/2005 | Taguchi et al. | 340/447 |
| 7,231,274 | B2 * | 6/2007 | Moulds et al. | 700/115 |
| 7,373,228 | B2 * | 5/2008 | Taguchi et al. | 701/33 |
| 2008/0094198 | A1 | 4/2008 | Yu | |

\* cited by examiner

*Primary Examiner*—Davetta W Goins

(57) ABSTRACT

A method and system of teaching identification codes for a tire pressure monitoring system includes the steps of transmitting a prompt signal that includes a location identifier. This prompt signal instructs the tire pressure monitoring sensor to transmit an initialization signal. The initialization signal includes the location identifier. A factory receiver is set up to recognize transmissions that include a corresponding location identifier. The receiver disregards all other transmissions that do not include the corresponding desired location identifier.

21 Claims, 3 Drawing Sheets

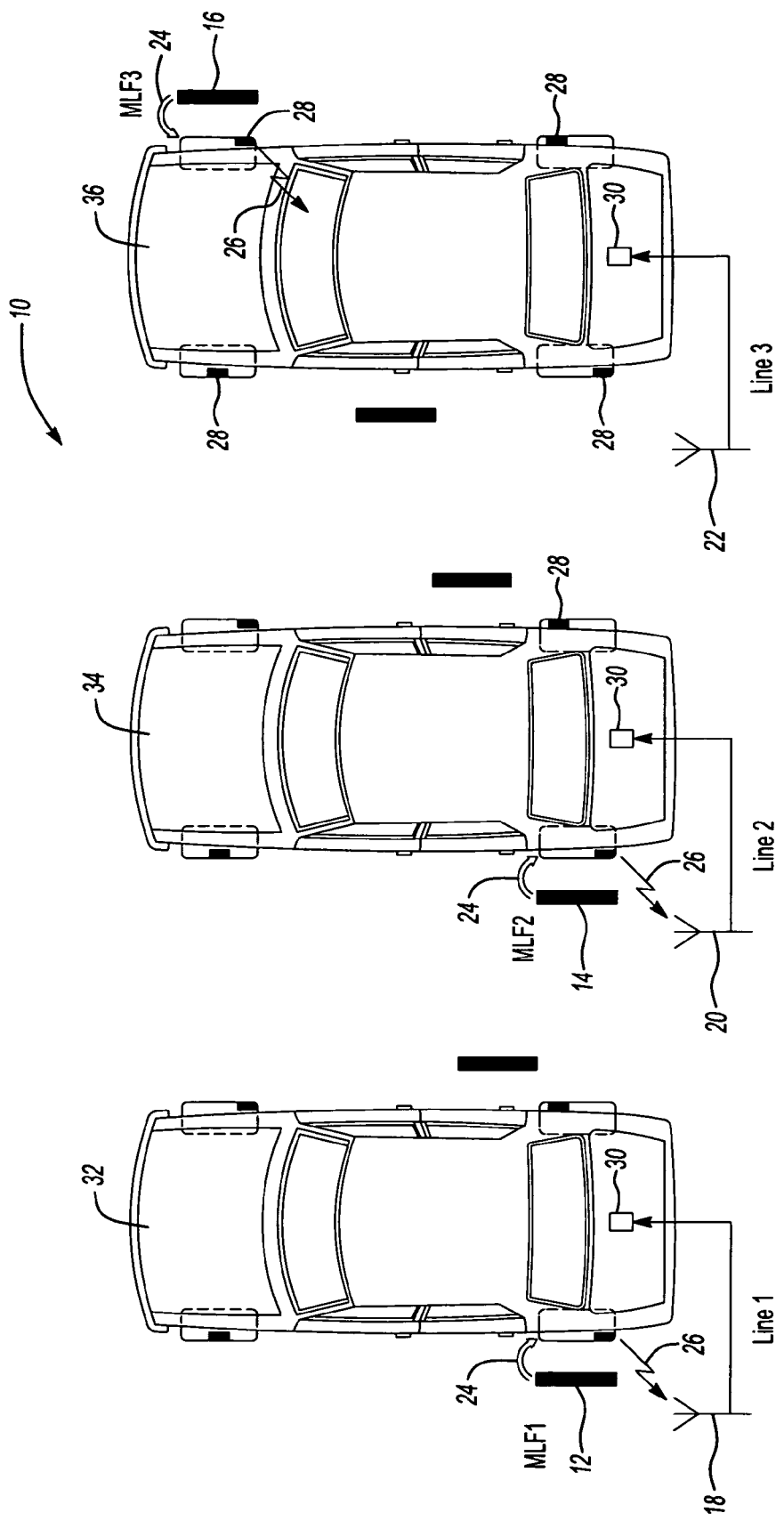

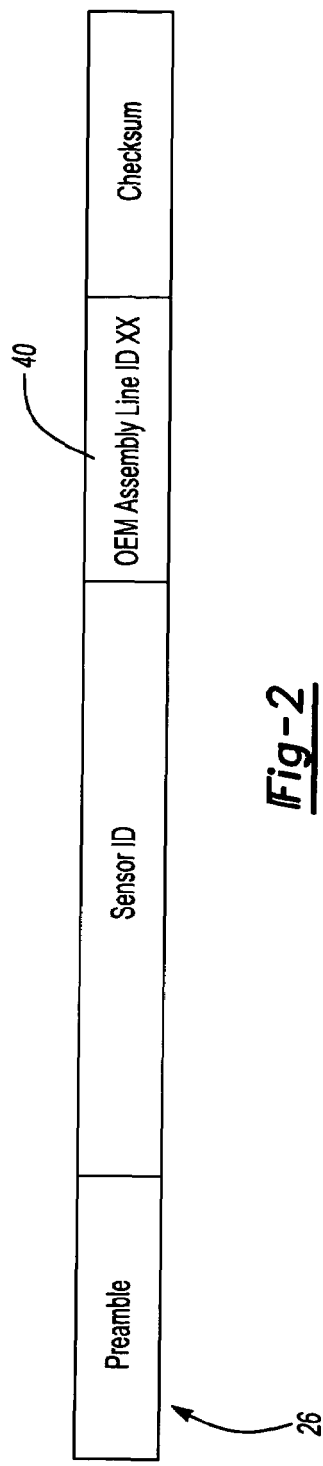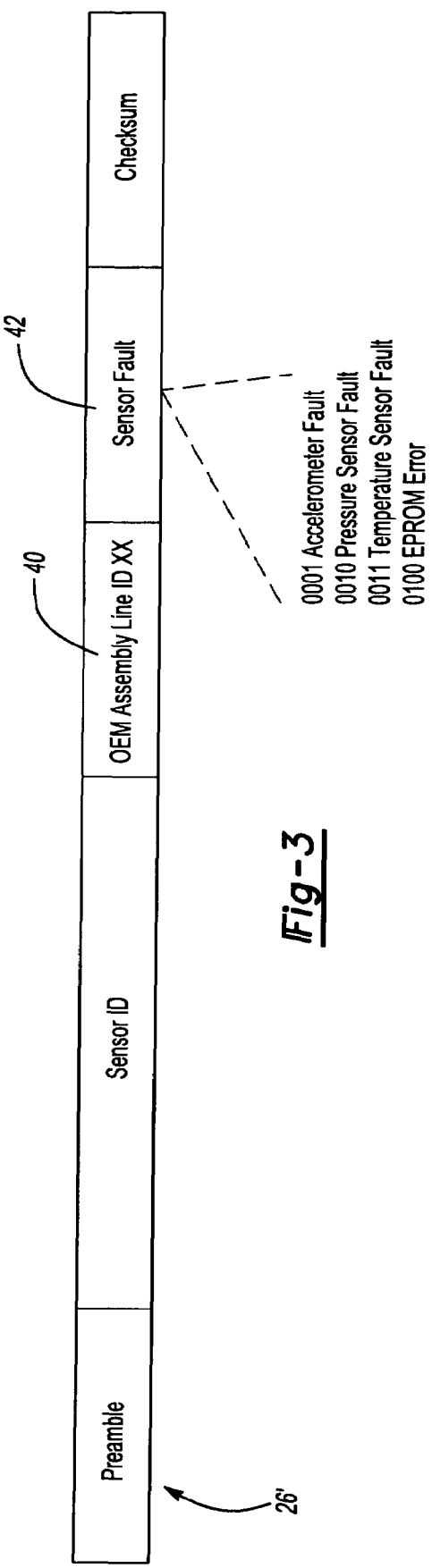

TIRE PRESSURE MONITORING SYSTEM PLANT LEARNING

CROSS REFERENCE TO RELATED APPLICATION

The application claims priority to U.S. Provisional Application Nos. 60/729,025 and 60/738,362 which were filed on Oct. 21, 2005.

BACKGROUND OF THE INVENTION

This invention generally relates to system and method for teaching identification information to a receiver for devices that communicate through radio frequencies. More particularly, this invention relates to a system and method for teaching and verifying identification information for systems that initialize a communication link between a remote radio frequency communication device and a receiver.

Remote activation and sensor devices communicate with a receiver that is programmed to recognize a specific remote activation device. The initial programming of such remote activation devices requires that a unique identifier of the remote device be communicated and stored within the receiver for future reference. During operation, the receiver interrogates incoming transmissions for the unique identifier and ignores those transmissions that do not include recognized identifiers. It is in this manner that a receiver discerns between remote devices that are part of another vehicle or system.

A tire pressure monitoring system for a vehicle is an example of a vehicle system that requires that unique identifiers for a each of the tire pressure monitoring sensors be communicated and stored in the vehicle receiver to facilitate future operation and recognition of particular sensors. Initial communication and storage of each sensor identifier for a vehicle is communicated to a receiver. This initial communication includes the prompting of each of the sensors to transmit the identification code to a receiver.

Disadvantageously, any transmission from the sensors is broadcast throughout a wide area, such that adjacent and separate receivers from different systems or vehicles may also receive the identification code and undesirably record that identification code as belonging to that particular vehicle or system. Such confusion between vehicles and sensors is not desirable.

Accordingly, it is desirable to design and develop a system for teaching remote device identifiers to a receiver and discerning between sensor identifiers not belonging to that particular vehicle or system.

SUMMARY OF THE INVENTION

An example system and method according to this invention provides for the learning of sensor identification codes by a vehicle receiver utilizing a location identifier that provides for the specific teaching of the sensor to a proper receiver.

An example system according to this invention includes a receiver that receives initialization transmissions from a tire pressure monitoring sensor disposed within a vehicle. The receiver is taught the specific identification code for the tire pressure monitoring sensors disposed within that vehicle. This is accomplished by sending a transmission prompt from a low frequency antenna disposed adjacent the vehicle. The transmission prompt provides information to the tire pressure monitoring system that initiates the tire pressure monitoring sensor to transmit an initialization signal. The initialization signal is transmitted by the various tire pressure monitoring sensors and is received by a receiver in the plant.

The plant receiver receives transmissions from the tire pressure monitoring sensors that correspond to a specific location. The plant receiver is able to discern from which location the tire pressure monitoring sensor is located by a specific identifier that is relayed by the transmission prompts to the tire pressure monitoring sensor. The plant receiver then recognizes and initiates saving of the tire pressure monitoring sensor identification codes only for those transmissions that correspond with a desired location identifier.

In one example method and system, the low frequency antenna provides and sends a code signal that provides an identification of the location of the tire pressure monitoring sensor. The tire pressure monitoring sensor then in turn relays this code to the receiver. In this system several receivers may be disposed substantially adjacent to each other. However, each receiver is set up to recognize and process only those transmissions with a specific location identification identifier code. In this example each of the receivers are set to receive transmissions of the same frequency. The difference being that each adjacent receiver corresponds with a unique adjacent low frequency antenna. Each antenna transmits a separate or different identification code such that the receiver will only receive transmissions from tire pressure monitoring systems that have been prompted by the corresponding low frequency antenna. In this way receipt of transmissions from tire pressure monitoring sensors on other vehicles is prevented.

Another example system includes three receivers all set to receive transmissions at different frequencies. Corresponding low frequency antennas to these receivers transmit instructions that cause each of the tire pressure monitoring sensors to transmit the initialization signal at a different frequency corresponding with the receiver that in turn corresponds with the specific location. Each of the tire pressure monitoring sensors is equipped with a fractional phase loop circuit that provides for the transmission at different frequencies. In this example system, each of the receivers is set to receive signals of different frequencies therefore it is substantially prevented from receiving transmissions from tire pressure monitoring sensors disposed on vehicles not corresponding with the receivers specific location.

In each of the example systems, once the identification code for the corresponding tire pressure monitoring sensors are received, those codes are input into the vehicle receiver and saved for use during operation of the vehicle.

Accordingly, the system and method of this invention provides for the initial learning of the tire pressure monitoring sensor identification codes by a vehicle receiver without errant learning of incorrect sensor identifiers.

These and other features of the present invention can be best understood from the following specification and drawings, the following of which is a brief description.

BRIEF DESCRIPTION OF THE DRAWINGS

FIG. 1 is a schematic illustration of an example system and method for teaching tire pressure monitoring identification codes.

FIG. 2 is a schematic representation of an initialization signal from a tire pressure monitoring sensor.

FIG. 3 is another schematic representation of a tire pressure monitoring sensor and initialization signal.

DETAILED DESCRIPTION OF THE PREFERRED EMBODIMENT

Figure 4:
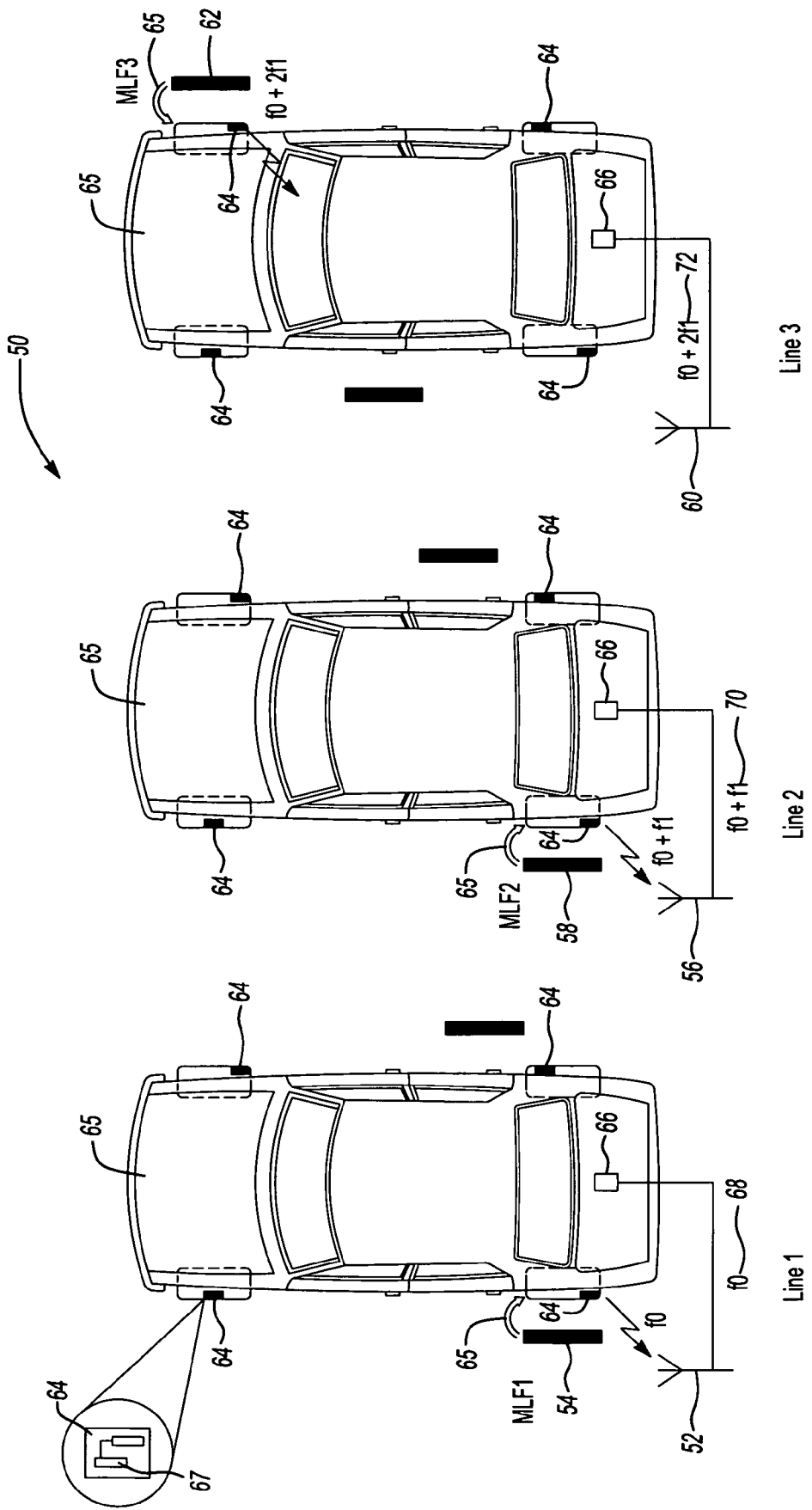
FIG. 4 is another example system for learning identification codes for learning for a tire pressure monitoring system.

Referring to FIG. 1, an example system 10 for teaching tire pressure monitoring sensor identification codes to a vehicle receiver includes a receiver 18 that receives signals 26 from a tire pressure monitoring sensor 28. The tire pressure monitoring sensor 28 sends a signal in response to a prompt signal 24 sent by a low frequency antenna 12. The initialization signal 26 includes a unique identification code that is specific to that tire pressure monitoring sensor 28. This specific identification code is received by a receiver 18 that is disposed within the plant. The receiver 18 disposed within the plant communicates these identification codes to a vehicle receiver 30 that is disposed within the vehicle. Once the initial identification codes are saved and stored within the vehicle receiver 30 operation and the signals from the tire pressure monitoring sensors 28 will be recognized by that receiver 30. The receiver 30 will ignore signals from all other tire pressure monitoring sensors that do not include identification codes that are recognized.

Transmissions from the low frequency antenna 12 are directed locally to each tire pressure monitoring sensor 28. The localized signals are not capable of crossing over to other lines or vehicles during the initialization process. However, the initialization signal 26 from the tire pressure monitoring sensors 28 are capable of crossing between different assembly lines.

Although this method and system is disclosed by way of an example tire pressure monitoring system other systems that required initialization and learning of specific identification codes will also benefit from the disclosure of this invention. For example, remote keyless entry systems and passive entry systems would also benefit from application of the example method and system.

As is illustrated schematically in the example, adjacent assembly lines include several vehicles being programmed substantially at the same time that can generate cross programming or cross signals that can cause confusion and create errant storage of tire pressure monitoring sensor identification codes. A tire pressure monitoring sensor 28 from a first line could possibly send an initialization signal 26 that could be received by a receiver 20 on a second line. That identification code may then stored within the receiver of the second vehicle. The vehicle receiver would only recognize those signals from those tire pressure monitoring sensors within which an identification code has been saved. Recording of identifiers from sensors disposed on other vehicles can undesirably affect operation of the tire pressure monitoring system.

The example method and system prevents such occurrences by including a specific location identifier. The specific location identifier is sent along with the prompt signal 24. Referring to example line 1, the low frequency antenna 12 sends a prompt signal 24. This prompt signal 24 includes the location identifier that is unique to line 1. The receiver 18 that corresponds with the line 1 is programmed only to receive and recognize those initialization transmissions that include a location identifier code that corresponds with line 1.

The receiver 20 for the second line is programmed to receive signals only that are transmitted by the low frequency antenna 14 that corresponds to the second line. The low frequency antenna 14 transmits localization codes that are specifically unique to the second assembly line. This code is transmitted by the prompt signal 24 to the tire pressure monitoring sensor 28. The tire pressure monitoring sensor 28 then repeats this identification code in its initialization transmission to the receiver 20.

Correspondingly, the assembly line 3 includes a receiver 22 that receives signals 26 only from tire pressure monitoring sensors 28 that have been prompted by the low frequency antenna 16 that corresponds with that third assembly line. Each assembly line includes a unique identification code that is transmitted and repeated by the tire pressure monitoring sensor 28 such that each receiver discerns which transmission is received and can identify where from that transmission is being sent.

In this example, each of the receivers 18, 20, 22 are set to receive tire pressure monitoring systems of a common frequency. In other words, each of the receivers 18, 20, 22 are capable of receiving tire pressure monitoring initialization signals 26 from each of the tire pressure monitoring sensors 28 on any of the vehicles. However, the receiver is set to discern and identify the transmission by the location identifier code that is contained within each of the initialization signals. In this way a common receiver configuration can be used for each line with only the modification of programming each receiver which location identification code it is to receive and record tire pressure monitoring sensor identification codes from.

Referring to FIGS. 2 and 3, example initialization signals 26, 26' are illustrated. These signals 26, 26' include a preamble, a sensor ID portion and an assembly line ID number 40. The assembly line ID number 40 is unique to each assembly line and corresponds with a matched low frequency antenna and receiver.

The initialization signal 26' (FIG. 3) includes the preamble sensor ID, the location identification code, and a sensor fault code 42. The sensor ID code comprises an alphanumeric code that is unique to each tire pressure monitoring sensor 28. This is a code that is saved within the vehicle receive 30 that is relied upon for and is utilized to discern between tire pressure monitoring sensors on other vehicles and those tire pressure monitoring sensors that are part of other vehicles.

Referring to FIG. 4, another example system according to this invention is schematically shown and indicated at 50. The system 50 is schematically shown in reference to use with three substantially proximate assembly lines. Each assembly line includes a separate receiver 52, 56, 60. Each of the receivers 52, 56, 60 is linked to provide specific tire pressure monitoring identification information to each of the specific vehicle receivers 66. In this example, each of the low frequency antennas 54, 58, 62 transmit a prompt signal 65 to the tire pressure monitoring sensor 64. The prompt signal 65 includes an instruction that dictates the frequency at which the tire pressure monitoring sensor 64 can transmit its initialization signal.

Each tire pressure monitoring sensor 64 includes a functional Phase looped logic circuit 67 that provides for the transmission of initialization signals at different frequencies. Accordingly, with reference to line 1, the low frequency antenna 54 transmits a prompt signal that instructs the tire pressure monitoring sensor 64 to transmit its initialization prompt at a first frequency 68. The receiver 52 is set up to recognize only signals that are at that first frequency 68.

The assembly line 2 includes another low frequency antenna 58 that instructs the tire pressure monitoring sensors on vehicles of the assembly line 2 to transmit the initialization signals at a frequency 70. The receiver 56 on the assembly line 2 is set up to recognize only those signals that are transmitted at the second frequency 70. The third assembly line includes a third receiver 60 that is set up to recognize only those transmissions at a third frequency 72 different from the other two frequencies transmitted by the tire pressure monitoring sensors 64. The third low frequency antenna 62 accordingly instructs the tire pressure monitoring sensor 64 to transmit the initialization prompt at the third frequency 72.

In the example system 50, because each of the receivers 52, 56, and 60 are set to recognize only a specific frequency different than all other receivers within a proximate area it is not possible for initialization prompts from one assembly line to be received by receivers of another assembly line.

Accordingly, the example systems provides for the learning of tire pressure monitoring identification codes while preventing the confusion caused by receipt of initialization transmissions from tire pressure monitoring sensors from other systems or vehicles to be associated with a specific vehicle receiver.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of teaching an identifier for a remote device to a corresponding mobile receiver comprising the steps of:
    a) transmitting a prompt signal to a remote device, where the transmission prompt communicates an identifier to the remote device;
    b) transmitting an initialization signal including the identifier from the remote device to a stationary receiver;
    c) selectively receiving the initialization signal with the stationary receiver responsive to the identifier corresponding with signals that the stationary receiver is set to recognize; and
    d) communicating the initialization signal from the stationary receiver to the mobile receiver.

2. The method as recited in claim 1, wherein the identifier comprises a location identifier indicative of a location of the sensor.

3. The method as recited in claim 2, including the step of reading the location identifier and recording an identification code responsive to the stationary receiver recognizing the location identifier.

4. The method as recited in claim 1, wherein the identifier comprise a unique frequency and the initialization signal is transmitted at the unique frequency.

5. The method as recited in claim 4, wherein the stationary receiver is set to recognize transmissions only on the unique frequency.

6. The method as recited in claim 1, including more than one stationary receiver and more than one identifier corresponding with the more than one stationary receivers.

7. A method of teaching an identification code of a tire pressure monitoring sensor to a vehicle receiver comprising the steps of:
    a) transmitting a prompt signal including an identifier to a tire pressure monitoring sensor;
    b) transmitting an initialization signal from the tire pressure monitoring sensor including the identifier received in the prompt signal;
    c) selectively receiving the initialization signal with a stationary receiver responsive to the stationary receiver recognizing the identifier; and
    d) communication the initialization signal from the stationary receiver to the vehicle receiver.

8. The method as recited in claim 7, wherein the identifier comprise a code indicative of a location of the tire pressure sensor.

9. The method as recited in claim 8, wherein the stationary receiver is associated with the code indicative of location and recognizes initialization signals only including the code indicative of a location of the tire pressure sensor corresponding to the stationary receiver.

10. The method as recited in claim 9, including at least two stationary receivers each set to receive an initialization signal of a common frequency.

11. The method as recited in claim 10, wherein each of the at least two stationary receivers correspond to a different location and is set to receive a different code indicative of location.

12. The method as recited in claim 7, wherein the identifier comprises a specific frequency and the tire pressure monitoring sensor transmits the initialization signal at the specific frequency.

13. The method as recited in claim 12, including more than one stationary receiver, only one of which is set to receive the specific frequency.

14. The method as recited in claim 12, wherein each of the more than one receivers are set to receive a frequency different than all of the other receivers.

15. A system for communicating tire pressure monitoring identities to a receiver installed within a vehicle comprising:
    a transmitter installed as a part of a vehicle assembly line for transmitting a prompt signal to a tire pressure sensor, where the prompt signal instructs the tire pressure monitoring sensor to transmit an initialization signal including a location identifier;
    an assembly line receiver installed as part of a vehicle assembly line for receiving initialization signals only including a corresponding location identifier; and
    a link between the assembly line receiver and the receiver installed within the vehicle for communicating the initialization signals to the receiver installed within the vehicle.

16. The system as recited in claim 15, comprising at least two transmitters and a corresponding assembly line receiver each corresponding to a desired location.

17. The system as recited in claim 15, wherein the location identifier comprises a frequency.

18. The system as recited in claim 17, wherein the tire pressure monitoring sensor includes a transmitter for transmitting at more than one frequency, where the transmitter transmits the initialization signal at the frequency instructed by the transmitter.

19. The system as recited in claim 18, wherein each of the at least two assembly line receivers receives signal of a frequency different than all the other receivers.

20. The system as recited in claim 15, wherein the location identifier includes a code sent with the initialization signal.

21. The system as recited in claim 20, wherein the assembly line receiver recognizes only those signals including a code corresponding to a location of the assembly line receiver.

* * * * *